United States Patent
Lu et al.

(10) Patent No.: US 10,419,746 B2
(45) Date of Patent: Sep. 17, 2019

(54) 3D DISPLAY APPARATUS AND 3D DISPLAY METHOD

(71) Applicants: BOE Technology Group Co., Ltd., Beijing (CN); Beijing BOE Optoelectronics Technology Co., Ltd., Beijing (CN)

(72) Inventors: Pengcheng Lu, Beijing (CN); Xue Dong, Beijing (CN); Xiaochuan Chen, Beijing (CN); Ming Yang, Beijing (CN); Qian Wang, Beijing (CN); Lei Wang, Beijing (CN); Rui Xu, Beijing (CN); Jian Gao, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 250 days.

(21) Appl. No.: 15/324,802

(22) PCT Filed: Dec. 22, 2015

(86) PCT No.: PCT/CN2015/098213
§ 371 (c)(1),
(2) Date: Jan. 9, 2017

(87) PCT Pub. No.: WO2017/028437
PCT Pub. Date: Feb. 23, 2017

(65) Prior Publication Data
US 2017/0201743 A1    Jul. 13, 2017

(30) Foreign Application Priority Data

Aug. 19, 2015 (CN) .......................... 2015 1 0511488

(51) Int. Cl.
*H04N 9/47* (2006.01)
*H04N 13/366* (2018.01)
(Continued)

(52) U.S. Cl.
CPC ........... *H04N 13/366* (2018.05); *H04N 13/31* (2018.05); *H04N 13/315* (2018.05); *H04N 13/32* (2018.05);
(Continued)

(58) Field of Classification Search
CPC ......... G02F 1/29; G02F 1/55; G02B 27/0093; G02B 27/2214; G02B 27/285; G09G 3/003
(Continued)

(56) References Cited

U.S. PATENT DOCUMENTS

| 7,148,862 B2 | 12/2006 | Morishima et al. |
| 9,826,222 B2 | 11/2017 | Koji |

(Continued)

FOREIGN PATENT DOCUMENTS

| CN | 102449534 A | 5/2012 |
| CN | 102722044 A | 10/2012 |

(Continued)

OTHER PUBLICATIONS

Third Office Action from Chinese Patent Application No. 201510511488.9, dated Sep. 28, 2017, 17 pages.
(Continued)

*Primary Examiner* — Gims S Philippe
(74) *Attorney, Agent, or Firm* — Westman, Champlin & Koehler, P.A.

(57) ABSTRACT

The present disclosure provides a 3D display apparatus and a 3D display method. The apparatus includes: a display screen which includes a plurality of pixels; a grating arranged to overlap with the display screen and including a
(Continued)

plurality of grating units which are configured to switch on or switch off; a location tracking module configured to detect a location of a viewer; a control module connected to the location tracking module, the display screen and the grating respectively, and configured to control some of pixels in the display screen to display a left eye image and to control the others of pixels in the display screen to display a right eye image on the basis of the location of the viewer, the control module also being configured to control some of the grating units in the grating to switch on to form bright grating units and to control the others of the grating units to switch off to form dark grating units such that the left eye image and the right eye image observed at the location do not interfere with each other.

17 Claims, 7 Drawing Sheets

(51) Int. Cl.
  *H04N 13/32* (2018.01)
  *H04N 13/398* (2018.01)
  *H04N 13/376* (2018.01)
  *H04N 13/31* (2018.01)
  *H04N 13/315* (2018.01)
  *H04N 13/373* (2018.01)

(52) U.S. Cl.
  CPC ......... *H04N 13/373* (2018.05); *H04N 13/376* (2018.05); *H04N 13/398* (2018.05)

(58) Field of Classification Search
  USPC ......... 315/156; 348/54; 345/31; 349/15, 117
  See application file for complete search history.

(56) References Cited

U.S. PATENT DOCUMENTS

| | | | | |
|---|---|---|---|---|
| 2003/0137626 | A1* | 7/2003 | Khazova | G02B 27/285 349/117 |
| 2010/0060983 | A1 | 3/2010 | Wu et al. | |
| 2013/0057159 | A1* | 3/2013 | Pijlman | G02B 27/0093 315/154 |
| 2013/0321246 | A1* | 12/2013 | Li | G09G 3/003 345/31 |
| 2014/0192172 | A1 | 7/2014 | Kang et al. | |
| 2014/0300536 | A1 | 10/2014 | Kim et al. | |
| 2015/0015668 | A1 | 1/2015 | Bennett et al. | |
| 2015/0077667 | A1* | 3/2015 | Lee | G02B 27/2214 349/15 |
| 2016/0182899 | A1* | 6/2016 | Liu | G02F 1/155 348/54 |
| 2016/0191909 | A1 | 6/2016 | Li et al. | |
| 2017/0038649 | A1* | 2/2017 | Lu | G02F 1/29 |
| 2017/0150132 | A1* | 5/2017 | Tian | H04N 13/368 |
| 2017/0155893 | A1* | 6/2017 | Mather | G02B 27/2214 |

FOREIGN PATENT DOCUMENTS

| | | |
|---|---|---|
| CN | 102740104 A | 10/2012 |
| CN | 102998805 A | 3/2013 |
| CN | 103048835 A | 4/2013 |
| CN | 103118267 A | 5/2013 |
| CN | 103209332 A | 7/2013 |
| CN | 103314596 A | 9/2013 |
| CN | 103581649 A | 2/2014 |
| CN | 103631021 A | 3/2014 |
| CN | 103931179 A | 7/2014 |
| CN | 104104942 A | 10/2014 |
| CN | 103048835 B | 4/2015 |
| CN | 104581129 A | 4/2015 |
| CN | 104597681 A | 5/2015 |
| CN | 105100783 A | 11/2015 |
| JP | 2004048702 A | 2/2004 |
| JP | 2015089104 A | 5/2015 |
| KR | 20140107923 A | 9/2014 |

OTHER PUBLICATIONS

Second Office Action for Chinese Patent Application No. 201510511488.9, dated Apr. 5, 2017, 20 pages.

International Search Report and Written Opinion of International Application No. PCT/CN2015/098213, dated May 13, 2016, 11 pages.

English translation of Box No. V of the Written Opinion for the International Searching Authority for International Application No. PCT/CN2015/098213, 2 pages.

First Office Action from Chinese Patent Application No. 201510511488.9, dated Aug. 24, 2016, 17 pages.

* cited by examiner

3D DISPLAY APPARATUS AND 3D DISPLAY METHOD

CROSS-REFERENCE TO RELATED APPLICATION

This application is a Section 371 National Stage Application of International Application No. PCT/CN2015/098213, filed on Dec. 22, 2015, entitled "3D Display Apparatus And 3D Display Method", which has not yet published, and which claims priority to Chinese Application No. 201510511488.9, filed on Aug. 19, 2015, incorporated herein by reference in their entirety.

BACKGROUND OF THE DISCLOSURE

Field of the Disclosure

The present disclosure relates to the field of display technology, and in particular, to a 3D display apparatus and a 3D display method.

Description of the Related Art

In recent years, 3D (three dimensional) display technology develops rapidly. The 3D display technology may provide pictures that become stereoscopic and vivid. In this way, an image will not be limited in a plane in which a display screen is located, and the viewers may have an immersed sense. The 3D display technology includes two categories, i.e., glasses type and naked-eyes type. The naked-eyes type 3D display technology becomes more popular than the glasses type display technology because it does not need to wear glasses.

As illustrated in FIG. 1, the naked eyes type 3D display apparatus mainly includes a backlight module (not shown), a display screen 100 and a grating 200 stacked in sequence. The backlight module is arranged to provide a light ray for displaying images on a display screen 100. The display screen 100 includes first pixels L and second pixels R arranged alternately. The first pixels L receive left eye image signals. The second pixels R receive right eye image signals. The grating 200 includes bright grating units and dark grating units arranged alternately and configured to split the light ray having passed through the display screen 100 such that the left eye of the viewer may receive the light ray from the first pixels to see the left eye image while the right eye of the viewer may receive the light ray from the second pixels to see the right eye image. The left eye image and the right eye image are synthesized by the brain to provide a three dimensional sense.

However, once the above naked-eyes type 3D display apparatus is produced, widths of the first pixels L, widths of the second pixels R in its display screen 100, widths of the bright grating units and the dark grating units in the grating 200 and the distance between the display screen 100 and the grating 200 may be fixed. Thus, the viewer does not see 3D images with good effects unless he is in a certain location. At other locations, the viewer will see the 3D images with large interferences. It may cause the viewer cannot freely adjust the viewing location, which may lead to a poor comfort in viewing.

In particular, again seeing FIG. 1, the viewer at this time is in the best viewing location. In this location, the left eye of the viewer only receives the light ray from the first pixels L while the right eye of the viewer only receives the light ray from the second pixels R and there is zero interference in the viewed 3D images. As illustrated in FIG. 2, a vertical distance S between the location in which the viewer is located and the 3D display apparatus is greater than a vertical distance between the best viewing location and the 3D display apparatus. As shown in FIG. 3, a vertical distance S between the location in which the viewer is located and the 3D display apparatus is shorter than a vertical distance between the best viewing location and the 3D display apparatus. In these scenes, the location in which the viewer is located, is not the best viewing location, and the left eye of the viewer not only receives the light ray from the first pixels L, but also receives the light ray from the second pixels R. That is, the left eye sees both the left eye image and the right eye image to cause interference. As such, the right eye of the viewer not only receives the light ray from the second pixels R, but also receives the light ray from the first pixels L. That is, the right eye also sees both the left eye image and the right eye image to cause interference.

SUMMARY

In order to at least partially alleviate the above defects in the prior art, the present application provides a 3D display apparatus and a 3D display method to solve the problem that the viewer cannot freely adjust its viewing location when he/she views the conventional naked-eyes type 3D display apparatus.

A first aspect of the present application provides a 3D display apparatus comprising a display screen which comprises a plurality of pixels, wherein the 3D display apparatus further comprises:

a grating arranged to overlap with the display screen and comprising a plurality of grating units which are configured to switch on or switch off;

a location tracking module configured to detect a location of a viewer;

a control module connected to the location tracking module, the display screen and the grating respectively, and configured to control some of pixels in the display screen to display a left eye image and to control the others of pixels in the display screen to display a right eye image on the basis of the location of the viewer, the control module also being configured to control some of the grating units in the grating to switch on to form bright grating units and to control the others of the grating units to switch off to form dark grating units such that the left eye image and the right eye image observed at the location do not interfere with each other.

A second aspect of the present application provides a 3D display method for the 3D display apparatus as described above, the 3D display method comprising:

Step S1 of detecting a location of the viewer;

Step S2 of controlling some of pixels in the display screen of the 3D display apparatus to display a left eye image and controlling the others of the pixels in the display screen to display a right eye image on the basis of the location of the viewer, and controlling some of the grating units in the grating of the 3D display apparatus to switch on to form bright grating units and controlling the others of the grating units to switch off to form dark grating units such that the left eye image and the right eye image observed at the location do not interfere with each other.

The above 3D display apparatus may control the display screen to carry out a display matched with the actual location of the viewer on the basis of the actual location of the viewer and to control the grating to form the bright grating units and the dark grating units matched with the actual location such that, at this location, the viewer's left eye only receives the light ray from the left eye image and his right eye only receives the light ray from the right eye image, and the left eye image and the right eye image do not interfere with each other. In this way, the viewer may see a 3D image with good effects at any locations, that is, the viewer may freely adjust the location himself in viewing while seeing the 3D image with good effects. As the 3D display method according to the present application is used for the 3D display apparatus, the 3D display method has the same advantageous effects as the above 3D display apparatus. The details will be omitted herein.

BRIEF DESCRIPTION OF THE DRAWINGS

In order to explain solutions in the embodiments of the present application or the prior art more explicitly, figures that are needed to describe the embodiments or the prior art are explained briefly below. Apparently, the following figures only show some of embodiments of the present application. It would be appreciated by the skilled person in the art that other figures may also be derived from these figures without any creative efforts.

EXPLANATION ABOUT REFERENCE NUMERALS

100—display screen; L—first pixel; R—second pixel;
200—grating; 201—bright grating unit; 202—dark grating unit;
D—grating unit; 300—location tracking module; 301—signal generator;
302—signal receiver; 303—location calculation unit; 400—control module;
401—parameter calculation unit; 402—display screen control unit; 403—grating control unit;
S—vertical distance between the location in which the viewer is positioned and a 3D display apparatus

DETAILED DESCRIPTION OF PREFERRED EMBODIMENTS OF THE DISCLOSURE

Technical solutions of embodiments of the present invention will be further explained clearly and entirely below with reference to the figures such that the objects, features and advantages of the present disclosure will become more apparent. Apparently, the described embodiments are only some of embodiments of the present application, instead of all of embodiments of the present application. All of other embodiments that may be derived from the embodiments of the present application without any creative efforts will fall within protection scope of the present application.

Figure 1:
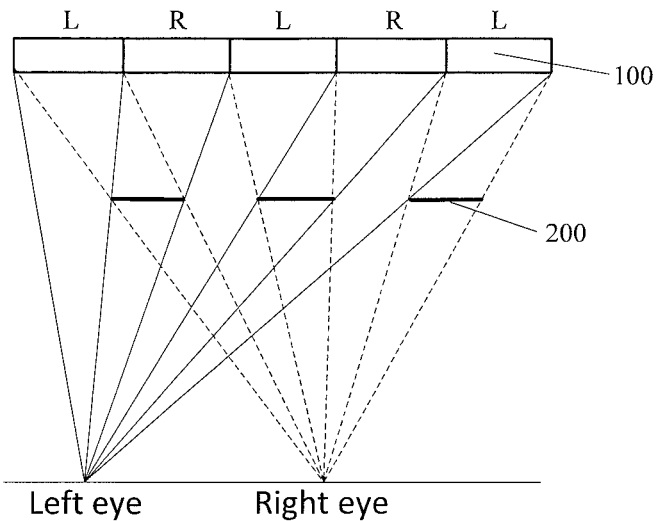
FIG. 1 is an optical path diagram of a 3D display apparatus in the prior art when the viewer is in the best viewing location.
Figure 2:
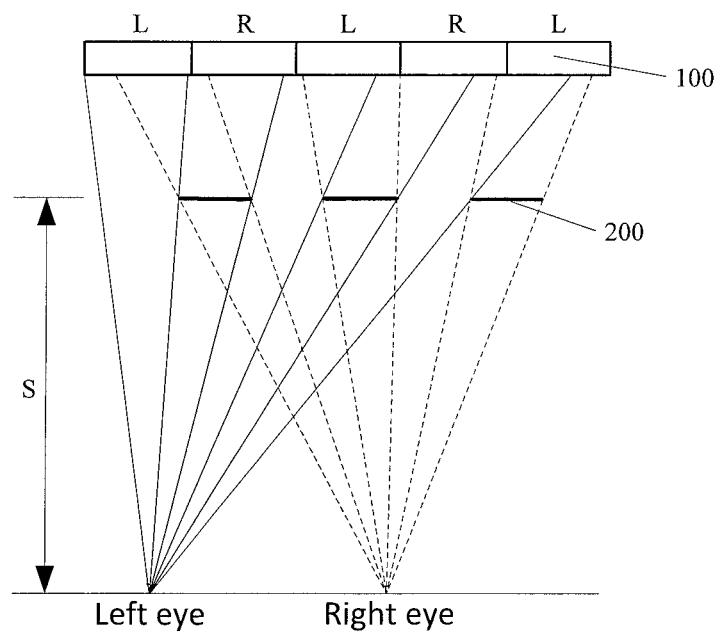
FIG. 2 is an optical path diagram of a 3D display apparatus in the prior art when the viewer is not in the best viewing location.
Figure 3:
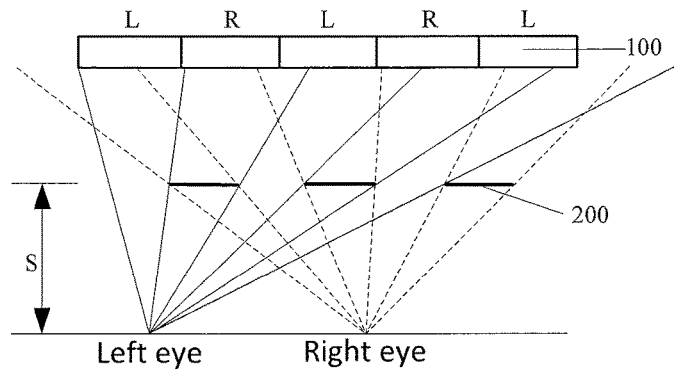
FIG. 3 is another optical path diagram of a 3D display apparatus in the prior art when the viewer is not in the best viewing location.
Figure 4:
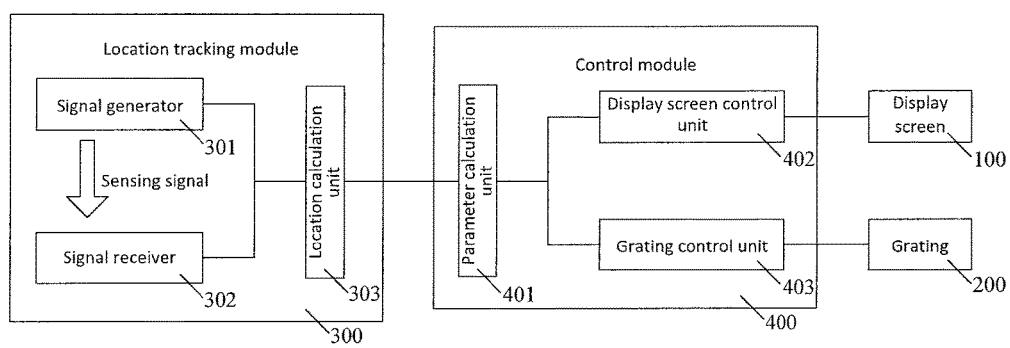
FIG. 4 is a schematic view showing a structural relation of a 3D display apparatus provided by an embodiment of the present application.
Figure 5:
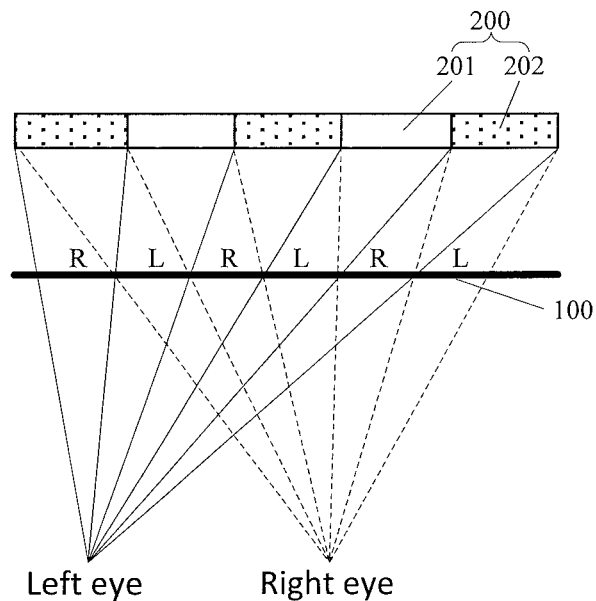
FIG. 5 is an optical path diagram of a 3D display apparatus provided by an embodiment of the present application.

An embodiment of the present application provides a 3D display apparatus, as shown in FIG. 4 and FIG. 5. The 3D display apparatus includes a display screen 100, a grating 200, a location tracking module 300 and a control module 400. The display screen 100 includes a plurality of pixels. The grating 200 and the display screen 100 are superposed or overlapped with each other, but are spaced apart by a certain distance from each other. The grating 200 includes a plurality of grating units which are configured to be switched on or switched off. The location tracking module 300 is configured to detect a location of a viewer. The control module 400 is connected to the location tracking module 300, the display screen 100 and the grating 200 respectively. The control module 400 is configured to control some of pixels in the display screen 100 to display a left eye image and to control the others of pixels to display a right eye image on the basis of the location of the viewer. The control module is also configured to control some of the grating units in the grating 200 to switch on to form bright grating units 201 and to control the others of the grating units to switch off to form dark grating units 202 such that the left eye image and the right eye image observed at the location do not interfere with each other.

Correspondingly, an embodiment also provides a 3D display method for the 3D display apparatus as described above. The 3D display method includes the following steps:

Step S1 of detecting a location of the viewer;

Step S2 of controlling some of pixels in the display screen of the 3D display apparatus 100 to display a left eye image and controlling the other of pixels to display a right eye image on the basis of the location of the viewer, and controlling some of the grating units in the grating 200 of the 3D display apparatus to switch on to form bright grating units and controlling the others of the grating units to switch off to form dark grating units such that the left eye image and the right eye image observed at the location do not interfere with each other.

In the above 3D display apparatus and the corresponding 3D display method, it is achieved to control the display screen 100 to carry out a display matched with the actual location of the viewer on the basis of the actual location of the viewer and to control the grating 200 to form the bright grating units 201 and the dark grating units 202 matched with the actual location such that, at this location, the viewer's left eye only receives the light ray from the left eye image and his right eye only receives the light ray from the right eye image and the left eye image and the right eye image do not interfere with each other. In this way, the viewer may see a 3D image with good effects at any locations, that is, the viewer may freely adjust the location himself in viewing while seeing the 3D image with good effects.

In an example, again see FIG. 4, the control module 400 in the above 3D display apparatus may include: a parameter calculation unit 401, a display screen control unit 402 and a grating control unit 403. The parameter calculation unit 401 is connected to the location tracking module 300 and configured to calculate widths of the first pixels L, positions of the first pixels L, widths of the second pixels R, positions of the second pixels R, widths of the bright grating units 201, positions of the bright grating units 201, widths of the dark grating units 202 and positions of the dark grating units 202 when the left eye image and the right eye image observed at the location do not interfere with each other on the basis of the location of the viewer. The display screen control unit 402 is connected to the parameter calculation unit 401 and the display screen 100 respectively and configured to control the corresponding pixels in the display screen 100 to display the left eye image on the basis of the widths of the first pixels L and the positions of the first pixels L and to control the corresponding pixels in the display screen 100 to display the right eye image on the basis of the widths of the second pixels R and the positions of the second pixels R. The grating control unit 403 is connected to the parameter calculation unit 401 and the grating 200 respectively and configured to control the corresponding grating units in the grating 200 to switch on to form the bright grating units 201 on the basis of the widths of the bright grating units 201 and the positions of the bright grating units 201 and to control the corresponding grating units in the grating 200 to switch off to form the dark grating units 202 on the basis of the widths of the dark grating units 202 and the positions of the dark grating units 202.

It should be noted that the term of "first pixels L" are the pixels for displaying the left eye image and the term of "second pixels R" are the pixels for displaying the right eye image. Further, it should be understood that in the present embodiment the terms of "first pixels L" and "second pixels R" are not intended to represent one or some of fixed pixels. When the viewer is in different locations, if it is achieved that the left eye image and the right eye image do not interfere with each other, the pixels for displaying the left eye (right eye) image corresponding to different viewing locations will be different from each other. In particular, the pixels for displaying the left eye (right eye) image have different widths and positions. That is, for different viewing locations, the pixels represented by the term of "first pixels L" may be different and the pixels represented by the term of "second pixels L" may be different.

In correspondence with the above technical solution that the control module 400 including the parameter calculation unit 401, the display screen control unit 402 and the grating control unit 403, the Step S2 in the 3D display method may include the following steps:

Step S21 of calculating widths of the first pixels L, positions of the first pixels L, widths of the second pixels R, positions of the second pixels R, widths of the bright grating units 201, positions of the bright grating units 201, widths of the dark grating units 202 and positions of the dark grating units 202 when the left eye image and the right eye image observed at the location do not interfere with each other on the basis of the location of the viewer;

Step S22 of controlling the corresponding pixels in the display screen 100 to display the left eye image on the basis of the widths of the first pixels L and the positions of the first pixels L and controlling the corresponding pixels in the display screen 100 to display the right eye image on the basis of the widths of the second pixels R and the positions of the second pixels R; while controlling the corresponding grating units in the grating 200 to switch on to form the bright grating units 201 on the basis of the widths of the bright grating units 201 and the positions of the bright grating units 201 and controlling the corresponding grating units in the grating 200 to switch off to form the dark grating units 202 on the basis of the widths of the dark grating units 202 and the positions of the dark grating units 202.

In the above Step S22, "controlling the corresponding pixels in the display screen 100 to display the left eye image on the basis of the widths of the first pixels L and the positions of the first pixels L" may be achieved by the following process: calculating the number of the pixels comprised in each of the first pixels L on the basis of the widths of the first pixels L and the width of an individual pixel in the display screen 100, and controlling the corresponding number of pixels at the corresponding positions to display the left eye image on the basis of the number of the pixels comprised in each of the first pixels L and the positions of the first pixels L. In the above process, the number of the pixels comprised in each of the first pixels L may be calculated by dividing the width of said first pixel L by the width of the individual pixel.

If the first pixel L has the same width as that of the second pixel R, the number of the pixels comprised in each of the first pixels L will be equal to the number of the pixels comprised in each of the second pixels R, and thus "controlling the corresponding pixels in the display screen 100 to display the right eye image on the basis of the widths of the second pixels R and the positions of the second pixels R" may be achieved by the following process: acquiring the number of the pixels comprised in each of the second pixels R on the basis of the number of the pixels comprised in each of the first pixels L, since the number of the pixels comprised in each of the second pixels R is equal to the number of the pixels comprised in each of the first pixels L, and controlling the corresponding number of pixels at the corresponding positions to display the right eye image on the basis of the number of the pixels comprised in each of the second pixels R and the positions of the second pixels R. Of course, alternatively, the number of the pixels comprised in each of the second pixels R may be calculated out firstly and then the number of the pixels comprised in each of the first pixels L may be calculated out on the basis of the number of the pixels comprised in each of the second pixels R.

If the first pixel L has the different width from that of the second pixel R, "controlling the corresponding pixels in the display screen 100 to display the right eye image on the basis of the widths of the second pixels R and the positions of the second pixels R" may be achieved by the following process: calculating the number of the pixels comprised in each of the second pixels R on the basis of the widths of the second pixels R and the width of an individual pixel in the display screen, and controlling the corresponding number of pixels the corresponding positions to display the right eye image on the basis of the number of the pixels comprised in each of the second pixels R and the positions of the second pixels R.

"Controlling the corresponding grating units in the grating 200 to switch on to form the bright grating units 201 on the basis of the width of the bright grating units 201 and the position of the bright grating units 201" may be achieved by the following process: calculating the number of the grating units 200 comprised in each of the bright grating units 201 on the basis of the widths of the bright grating units 201 and the width of an individual grating unit in the grating 200, and controlling the corresponding number of the grating units at the corresponding positions to switch on to form the bright grating units 201 on the basis of the number of the grating units comprised in each of the bright grating units 201 and the positions of the bright grating units 201. In the above process, the number of the pixels comprised in each of the bright grating units 201 may be calculated by dividing the width of said bright grating unit 201 by the width of the individual grating unit.

If the bright grating unit 201 has the same width as that of the dark grating unit 202, the number of the grating units comprised in each of the bright grating units 201 will be equal to the number of the grating units comprised in each of the dark grating units 202, and "controlling the corresponding grating units in the grating 200 to switch on to form the bright grating units 201 on the basis of the widths of the dark grating units 202 and the positions of the dark grating units 202" may be achieved by the following process: acquiring number of the grating units comprised in each of the dark grating units 202 on the basis of the number of the grating units comprised in each of the bright grating units 201, since the number of the grating units comprised in each of the dark grating units 202 is equal to the number of the grating units comprised in each of the bright grating units 201; controlling the corresponding number of the grating units at the corresponding positions to switch off to form the dark grating units 202 on the basis of the number of the grating units comprised in each of the dark grating units 202 and the positions of the dark grating units 202. Of course, alternatively, the number of the grating units comprised in each of the dark grating units 202 may be calculated out firstly and then the number of the grating units comprised in each of the bright grating units 201 may be calculated out on the basis of the number of the grating units comprised in each of dark grating units 202.

If the bright grating unit 201 has a different width from that of the dark grating unit 202, then "controlling the corresponding grating units in the grating 200 to switch on to form the bright grating units 201 on the basis of the widths of the dark grating units 202 and the positions of the dark grating units 202" may be achieved by the following process: calculating the number of the grating units comprised in each of the dark grating units 202 on the basis of the widths of the dark grating units 202 and the width of an individual grating unit in the grating 200 and controlling the corresponding number of the grating units at the corresponding positions to switch off to form the dark grating units 202 on the basis of the number of the grating units comprised in each of the dark grating units 202 and the positions of the dark grating units 202.

With reference to the above technical solutions, some specific examples will be given below so as to explain the technical solutions provided by the embodiments explicitly.

Figure 6:
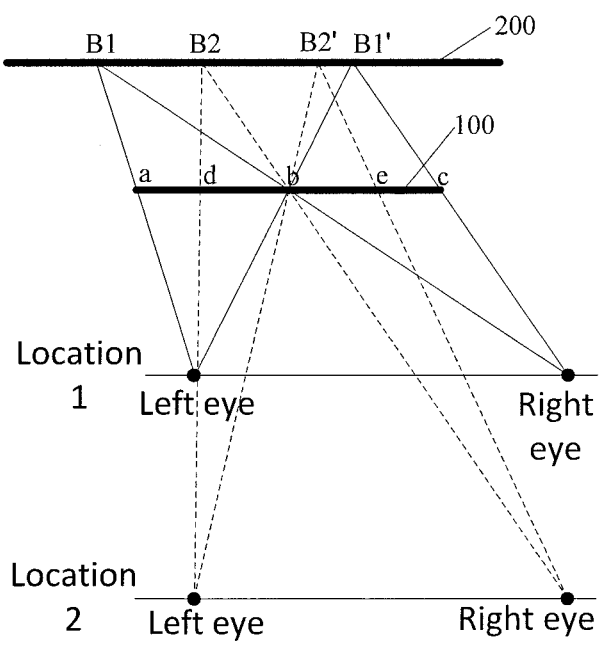
FIG. 6 is an optical path diagram of a 3D display apparatus provided by an embodiment of the present application, where the viewer is in a location 1 and a location 2.

In an example, as shown in FIG. 6, when the location tracking module 300 detects that the viewer is in the location 1, the control module 400 sets the width of the first pixel in the display screen 100 to be ab, sets the width of the second pixel to be cb, and sets the width of the bright grating unit in the grating 200 to be B1-B1'. In such circumstance, the left eye may only see the left eye image and the right eye may only see the right eye image and the left eye image and the right eye image do not interfere with each other. When the location tracking module 300 detects that the location of the viewer changes to the location 2 farther than the location 1, the control module 400 reduces the width of the first pixel in the display screen 100 into db, reduces the width of the second pixel into eb, and reduces the width of the bright grating unit in the grating 200 into B2-B2'. In such circumstance, the left eye may only see the left eye image and the right eye may only see the right eye image and the left eye image and the right eye image still do not interfere with each other.

Figure 7:
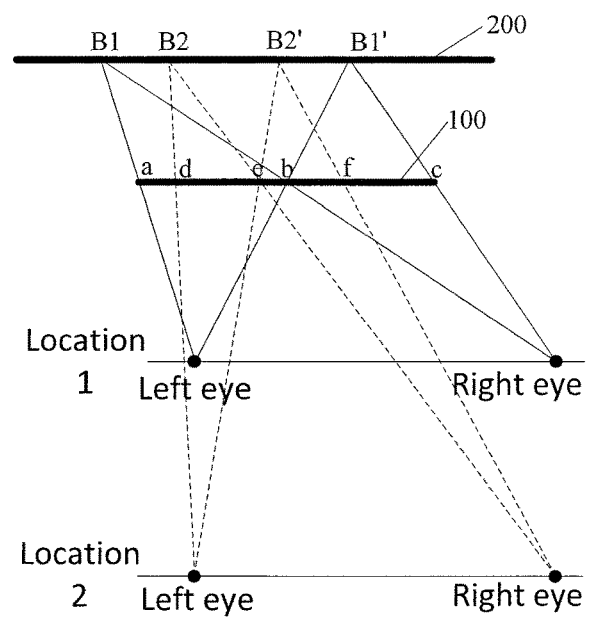
FIG. 7 is another path diagram of a 3D display apparatus provided by an embodiment of the present application, where the viewer is in a location 1 and a location 2 and at a different view angle from FIG. 6.

In an example, as shown in FIG. 7, when the location tracking module 300 detects that the viewer is in the location 1, the control module 400 sets the width of the first pixel in the display screen 100 as ab, sets the width of the second pixels as cb, and sets the width of the bright grating unit in the grating 200 as B1-B1'. In such circumstance, the left eye image and the right eye image do not interfere with each other. When the location tracking module 300 detects that the location of the viewer changes to the location 2 farther than the location 1, the control module 400 reduces the width of the first pixel in the display screen 100 into de, reduces the width of the second pixel into fe, and reduces the width of the bright grating unit in the grating 200 into B2-B2'. In such circumstance, the left eye image and the right eye image still do not interfere with each other, which is the same as the viewer in the location 1.

Figure 8:
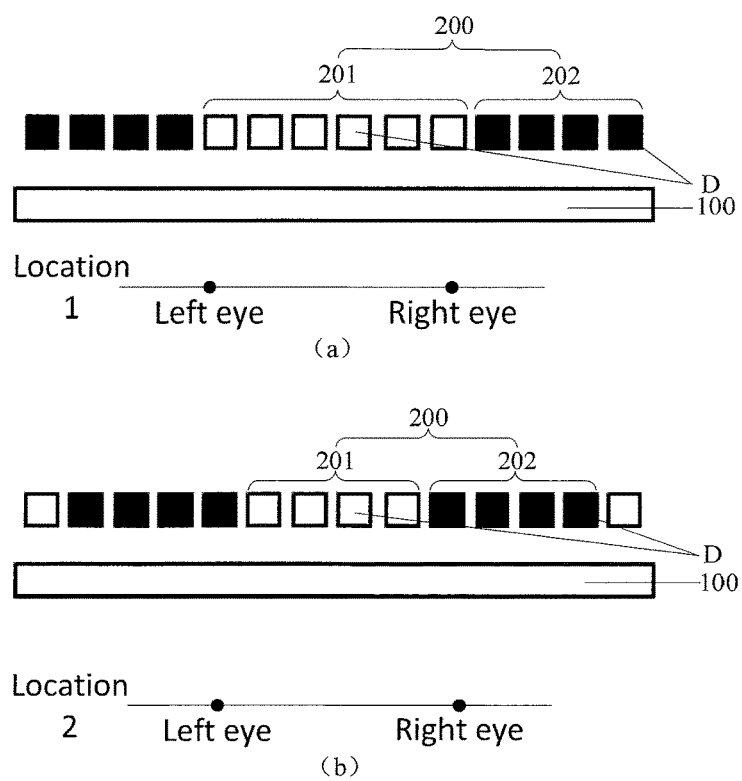
FIG. 8 is a schematic view showing a cross section of a grating in a 3D display apparatus corresponding to FIG. 6 and FIG. 7.

It should be noted that as shown in FIG. 8(a), when the viewer is in the location 1, the width of the bright grating unit 201 in the grating 200 may be set as B1-B1' by causing a plurality of continuous grating units D to switch on. As shown in FIG. 8(b), when the viewer is in the location 2, the width of the bright grating unit 201 in the grating 200 may be set as B2-B2' smaller than B1-B1' by causing a plurality of continuous grating units D to switch on. In such circumstance, the number of the grating units D comprised in the bright grating unit 201 is smaller than those when the viewer is in the location 1.

Figure 9:
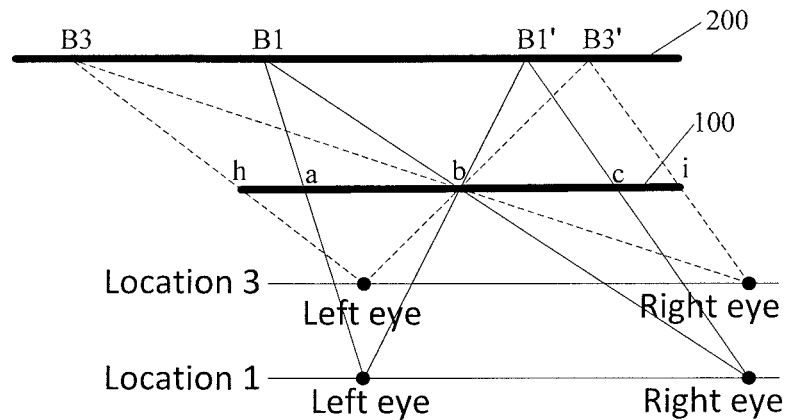
FIG. 9 is an optical path diagram of a 3D display apparatus provided by an embodiment of the present application, where the viewer is in a location 1 and a location 3.

In an example, as shown in FIG. 9, when the location tracking module 300 detects that the viewer is in the location 1, the control module 400 sets the width of the first pixel in the display screen 100 as ab, sets the width of the second pixel as cb, and sets the width of the bright grating unit in the grating 200 as B1-B1'. In such circumstance, the left eye image and the right eye image do not interfere with each other. When the location tracking module 300 detects that the location of the viewer changes to the location 3 closer than the location 1, the control module 400 increases the width of the first pixel in the display screen 100 into hb, increases the width of the second pixel into ib, and increases the width of the bright grating unit in the grating 200 into B3-B3'. In such circumstance, the left eye image and the right eye image still do not interfere with each other, as the viewer in the location 1.

Figure 10:
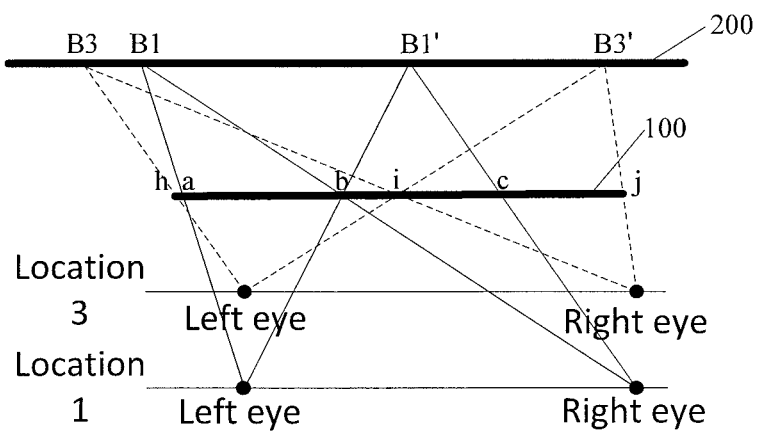
FIG. 10 is another path diagram of a 3D display apparatus provided by an embodiment of the present application, where the viewer is in a location 1 and a location 3 and at a different view angle from FIG. 9.

In an example, as shown in FIG. 10, when the location tracking module 300 detects that the viewer is in the location 1, the control module 400 sets the width of the first pixel in the display screen 100 as ab, sets the width of the second pixel as cb, and sets the width of the bright grating unit in the grating 200 as B1-B1'. In such circumstance, the left eye image and the right eye image do not interfere with each other. When the location tracking module 300 detects that the location of the viewer changes to the location 3 closer than the location 1, the control module 400 increases the width of the first pixel in the display screen 100 into hi, increases the width of the second pixel into ji, and increases the width of the bright grating unit in the grating 200 into B3-B3'. In such circumstance, the left eye image and the right eye image still do not interfere with each other, as the viewer in the location 1.

Figure 11:
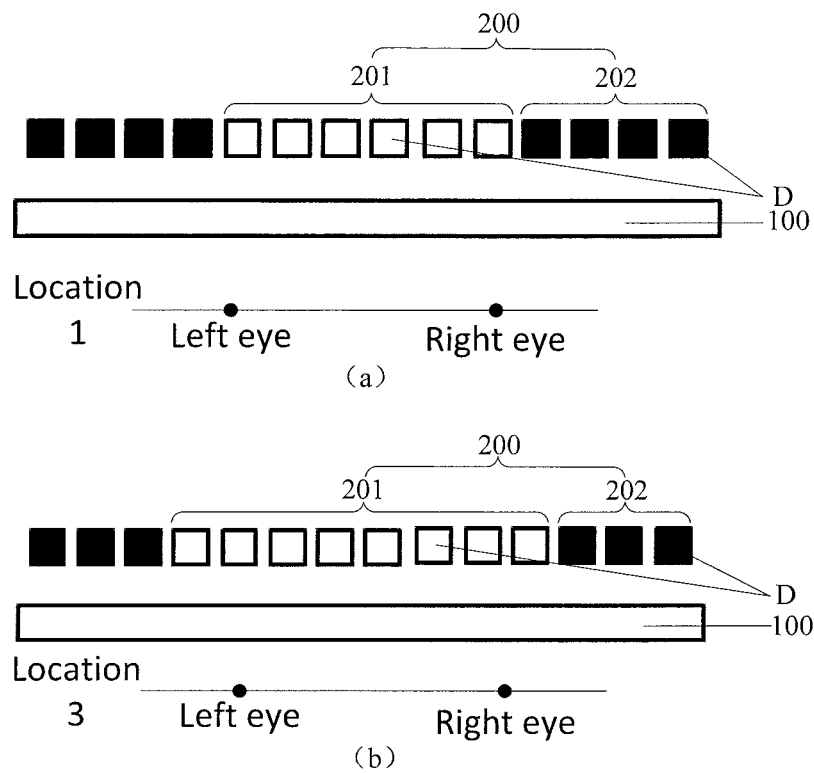
FIG. 11 is a schematic view showing a cross section of the grating in a 3D display apparatus corresponding to FIG. 9 and FIG. 10.

It should be noted that as shown in FIG. 11(a), when the viewer is in the location 1, the width of the bright grating unit 201 in the grating 200 may be set as B1-B1' by causing a plurality of continuous grating units D to switch on. As shown in FIG. 11(b), when the viewer is in the location 3, the width of the bright grating unit 201 in the grating 200 may be set as B3-B3' larger than B1-B1' by causing a plurality of continuous grating units D to switch on. In such circumstance, the number of the grating units D comprised in the bright grating unit 201 is larger than that when the viewer is in the location 1.

It should be noted that the above four specific embodiments are mainly based on the case that the vertical distance between the location in which the viewer is located and the 3D display apparatus varies. The parameters that can characterize the location in which the viewer is located not only include the vertical distance between the location in which the viewer is located and the 3D display apparatus, but also include an angle of view at which the viewer sees the 3D display apparatus. For the case that the angle of view varies and the case that the vertical distance and the angle of view both vary, the technical solutions provided by the embodiments are also applicable. The details for the specific examples will be omitted herein.

In the 3D display apparatus provided by the embodiment, the grating unit in the grating 200 may include OLED (Organic Light-Emitting Diode) light emitting devices. The OLED light emitting devices are white OLED light emitting devices. In order to achieve the color display function of the 3D display apparatus, correspondingly, the display screen 100 includes a color resister layer, the color resister layer at least including a red resister, a green resistor and a blue resistor. Or, the OLED light emitting devices in each of the grating units may include red OLED light emitting devices, green OLED light emitting devices or blue OLED light emitting devices. The grating 200 should at least include red OLED light emitting devices, green OLED light emitting devices and blue OLED light emitting devices, so as to achieve the color display function of the 3D display apparatus. In this circumstance, the display screen 100 may not be provided with a color resister layer at least including a red resister, a green resistor and a blue resistor.

In an alternative, the grating unit in the grating 200 may include a plurality of LED (Light-Emitting Diode) lamps, so as to produce a uniform planar light source in each of the grating units. The plurality of LED lamps in the grating unit may be arranged in a dot array, so as to improve the uniformity of the light emitted from the grating unit.

Figure 12:
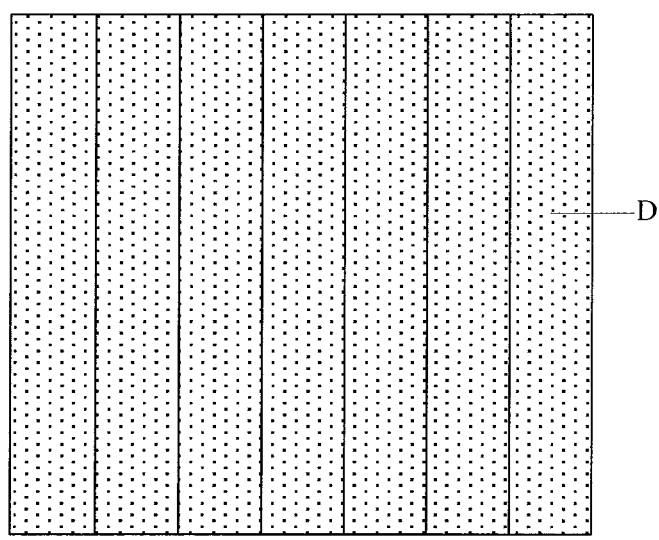
FIG. 12 is a plan view showing a grating in the 3D display apparatus provided by an embodiment of the present application.
Figure 13:
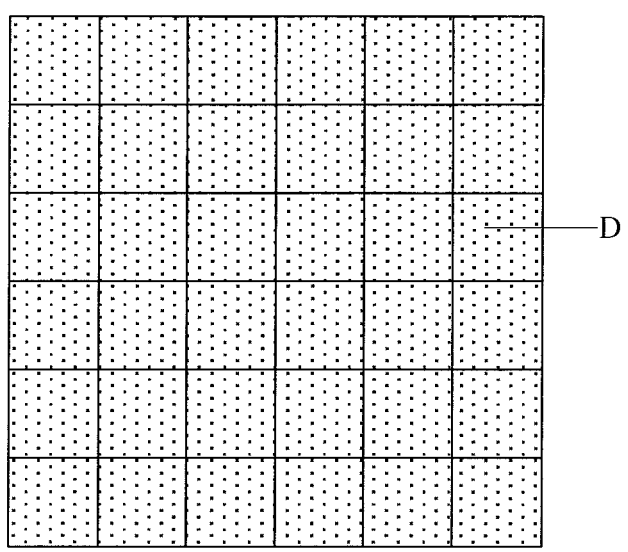
FIG. 13 is another plan view showing a grating in the 3D display apparatus provided by an embodiment of the present application.

In the embodiment, as shown in FIG. 12, the grating units D in the grating 200 may have shapes of stripes and may be arranged side by side. Or, as shown in FIG. 13, the grating units D in the grating 200 may have shapes of blocks, for example, circles, trapezoids or other shapes, and may be arranged in a matrix. The grating units D may be controlled actively or passively to control the OLED light emitting devices in certain grating units D to switch on and to control the OLED light emitting devices in certain grating units D to switch off. In an example, in the grating to be formed, the bright grating units and the dark grating units both extend longitudinally and are arranged alternately in traverse direction. In the example, the bright grating units may be formed by driving the odd columns of grating units D to switch on and the dark grating units may be formed by driving the even columns of grating units D to switch off; or the bright grating units may be formed by driving the continuous m columns of grating units D to switch on and the dark grating units may be formed by driving the continuous n columns of grating units D to switch off.

In the 3D display apparatus provided by the embodiment, the grating 200 may be overlapped or superposed on a backside of the display screen 100. The distance between them may be arranged as required and the display screen 100 may be a liquid crystal display screen. In this way, in 3D display, not only the grating 200 functions to split a light, but also the bright grating units in the grating 200 may provide the light ray needed to display images for the display screen 100 to function as the backlight module. Thus, in comparison with the conventional liquid crystal naked eyes type 3D display apparatus, the above 3D display apparatus may save up the backlight module and thin the entire thickness of the apparatus greatly.

Also, in 3D display, only the grating units included in the bright grating units in the grating 200 switch on and the grating units included in the dark grating units in the grating 200 switch off, that is, all of the grating units in the grating 200 do not switch on. In contrast, in the conventional liquid crystal naked eyes type 3D display apparatus, all of the backlight modules for providing the light rays switch on. Thus, the grating 200 is superposed on the backside of the display screen 100 and the display screen 100 is the 3D display apparatus with the liquid crystal display screen, which may save up power consumption.

Again see FIG. 4, in the embodiment, the location tracking module 300 may include: a signal generator 301, a signal receiver 302 and a location calculation unit 303. The signal generator 301 is configured to emit a sensing signal. The signal receiver 302 is configured to receive the sensing signal. The location calculation unit 303 is connected to the signal generator 301 and the signal receiver 302 respectively and configured to calculate a vertical distance between the location of the viewer and the 3D display apparatus and a view angle at which the viewer sees the 3D display apparatus on the basis of the emitting time and the receiving time of the sensing signal. The vertical distance and the view angle may characterize or determine the location of the viewer or the location of the viewer with respect to the display screen of the 3D display apparatus.

In the above location tracking module 300, the signal generator 301 and the signal receiver 302 may both be arranged on the display screen 100. They are arranged adjacent to each other or integrated together. The sensing signal emitted by the signal generator 301 may be reflected by the viewer back to the display screen 100 and then received by the signal receiver 302. Or, the signal generator 301 may be arranged on the display screen 100 and the signal receiver 302 may be arranged on a carrier (such as glasses) which is worn by the viewer. Certainly, the position of the signal generator 301 and the position of the signal receiver 302 may also be interchanged, and when the sensing signal emitted by the signal generator 301 is transmitted to the location in which the viewer is located, the sensing signal is received by the signal receiver 302 on the carrier which is worn by the viewer.

It should be noted that in the embodiments, how to arrange the first pixels, the second pixels, the bright grating units and the dark grating units in the disclosure has been explained with reference to one viewer. However, it would be appreciated by the skilled person in the art, in case that there are a plurality of viewers, one viewer of the viewers may be set with respect to the viewer as a center, or the viewing comfort of the viewers may be calculated out by a controller and an estimation rule may be determined reasonably on the basis of the viewing comfort of all of the viewers. In this way, how to ensure all of the plurality of viewers to have relatively good comfort in viewing may be determined finally.

The 3D display apparatus provided by the embodiments may be applied in any products or components with display function, such as cell phones, tablet computers, televisions, display devices, notebook computers, digital photo frames or navigators. The above embodiments are only given by way of examples, instead of limiting the protection scope of present application. It would be appreciated that various changes or alternations that can be envisaged easily by the skilled person in the art without departing from the scope of the disclosure will also fall within the protection scope of the present application. Therefore, the protection scope of the present application will be defined by the appended claims.

What is claimed is:

1. A 3D display apparatus, comprising a display screen which comprises a plurality of pixels, wherein the 3D display apparatus further comprises:
    a grating arranged to overlap with the display screen and comprising a plurality of grating units which are configured to switch on or switch off;
    a location tracking module configured to detect a location of a viewer; and
    a control module connected to the location tracking module, the display screen and the grating respectively, and configured to control some of pixels in the display screen to display a left eye image and to control the others of pixels in the display screen to display a right eye image on the basis of the location of the viewer, the control module also being configured to control some of the grating units in the grating to switch on to form bright grating units and to control the others of the grating units to switch off to form dark grating units such that the left eye image and the right eye image observed at the location do not interfere with each other;
    wherein the control module comprises:
    a parameter calculation unit connected to the location tracking module and configured to calculate widths of the first pixels, positions of the first pixels, widths of the second pixels, positions of the second pixels, widths of the bright grating units, positions of the bright grating units, widths of the dark grating units and positions of the dark grating units when the left eye image and the right eye image observed at the location do not interfere with each other on the basis of the location of the viewer, wherein the first pixels are the pixels for displaying the left eye image and the second pixels are the pixels for displaying the right eye image;
    a display screen control unit connected to the parameter calculation unit and the display screen respectively and configured to control the corresponding pixels in the display screen to display the left eye image on the basis of the widths of the first pixels and the positions of the first pixels and to control the corresponding pixels in the display screen to display the right eye image on the basis of the widths of the second pixels and the positions of the second pixels; and
    a grating control unit connected to the parameter calculation unit and the grating respectively and configured to control the corresponding grating units in the grating to switch on to form the bright grating units on the basis of the widths of the bright grating units and the positions of the bright grating units and to control the corresponding grating units in the grating to switch off to form the dark grating units on the basis of the widths of the dark grating units and the positions of the dark grating units.

2. The 3D display apparatus according to claim 1, wherein the grating units comprise OLED light emitting devices.

3. The 3D display apparatus according to claim 2, wherein the OLED light emitting devices are white OLED light emitting devices, and the display screen comprises a color resister layer, the color resister layer at least comprising a red resister, a green resistor and a blue resistor; or
    the grating at least comprises red OLED light emitting devices, green OLED light emitting devices and blue OLED light emitting devices.

4. The 3D display apparatus according to claim 1, wherein the grating units comprise a plurality of LED lamps.

5. The 3D display apparatus according to claim 4, wherein the plurality of LED lamps in the grating units are arranged in a dot array.

6. The 3D display apparatus according to claim 1, wherein the grating units have shapes of stripes or blocks.

7. The 3D display apparatus according to claim 6, wherein the grating units are arranged in a matrix when they have shapes of blocks.

8. The 3D display apparatus according to claim 1, wherein the grating is superimposed on a backside of the display screen and the display screen is a liquid crystal display screen.

9. The 3D display apparatus according to claim 1, wherein the location tracking module comprises:
    a signal generator configured to emit a sensing signal;
    a signal receiver configured to receive the sensing signal;
    a location calculation unit connected to the signal generator and the signal receiver respectively and configured to calculate a vertical distance between the location of the viewer and the 3D display apparatus and a view angle at which the viewer sees the 3D display apparatus on the basis of an emitting time and a receiving time of the sensing signal, the vertical distance and the view angle characterizing the location of the viewer.

10. A 3D display method for the 3D display apparatus according to claim 1, the 3D display method comprising:
    Step S1 of detecting a location of the viewer;
    Step S2 of controlling some of pixels in the display screen of the 3D display apparatus to display a left eye image and controlling the others of the pixels in the display screen to display a right eye image on the basis of the location of the viewer, and controlling some of the grating units in the grating of the 3D display apparatus to switch on to form bright grating units and controlling the others of the grating units to switch off to form dark grating units such that the left eye image and the right eye image observed at the location do not interfere with each other;
    wherein the Step S2 comprises:
    Step S21 of calculating the widths of the first pixels, the positions of the first pixels, the widths of the second pixels, the positions of the second pixels, the widths of the bright grating units, the positions of the bright grating units, the widths of the dark grating units and the positions of the dark grating units when the left eye image and the right eye image observed at the location do not interfere with each other on the basis of the location of the viewer, wherein the first pixels are the pixels for displaying the left eye image and the second pixels are the pixels for displaying the right eye image;

Step S22 of controlling the corresponding pixels in the display screen to display the left eye image on the basis of the widths of the first pixels and the positions of the first pixels and controlling the corresponding pixels in the display screen to display the right eye image on the basis of the widths of the second pixels and the positions of the second pixels; while controlling the corresponding grating units in the grating to switch on to form the bright grating units on the basis of the widths of the bright grating units and the positions of the bright grating units and controlling the corresponding grating units in the grating to switch off to form the dark grating units on the basis of the widths of the dark grating units and the positions of the dark grating units.

11. The 3D display method according to claim 10, wherein controlling the corresponding pixels in the display screen to display the left eye image on the basis of the calculated widths of the first pixels and the calculated positions of the first pixels comprises:
  calculating the number of the pixels comprised in each of the first pixels on the basis of the width of said first pixel and a width of an individual pixel in the display screen;
  controlling the corresponding number of pixels at corresponding positions to display the left eye image on the basis of the number of the pixels comprised in each of the first pixels and the position of said first pixel.

12. The 3D display method according to claim 11, wherein in response to the first pixel having the same width as that of the second pixel, controlling the corresponding pixels in the display screen to display the right eye image on the basis of the widths of the second pixels and the positions of the second pixels comprises:
  acquiring the number of the pixels comprised in each of the second pixels on the basis of the number of the pixels comprised in each of the first pixels;
  controlling the corresponding number of pixels at corresponding positions to display the right eye image on the basis of the number of the pixels comprised in each of the second pixels and the position of said second pixel.

13. The 3D display method according to claim 11, wherein in response to the first pixel having a different width from that of the second pixel, controlling the corresponding pixels in the display screen to display the right eye image on the basis of the calculated widths of the second pixels and the calculated positions of the second pixels comprises:
  calculating the number of the pixels comprised in each of the second pixels on the basis of the width of said second pixel and a width of an individual pixel in the display screen;
  controlling the corresponding number of pixels at corresponding positions to display the right eye image on the basis of the number of the pixels comprised in each of the second pixels and the position of said second pixel.

14. The 3D display method according to claim 10, wherein controlling the corresponding grating units in the grating to switch on to form the bright grating units on the basis of the widths of the bright grating units and the positions of the bright grating units comprises:
  calculating the number of the grating units comprised in each of the bright grating units on the basis of the width of said bright grating unit and a width of an individual grating unit in the grating;
  controlling the corresponding number of the grating units at the corresponding positions to switch on to form the bright grating units on the basis of the number of the grating units comprised in each of the bright grating units and the position of said bright grating unit.

15. The 3D display method according to claim 14, wherein in response to the bright grating units having a same width as that of the dark grating units, controlling the corresponding grating units in the grating to switch on to form the bright grating units on the basis of the widths of the dark grating units and the positions of the dark grating units comprises:
  acquiring the number of the grating units comprised in each of the dark grating units on the basis of the number of the grating units comprised in each of the bright grating units;
  controlling the corresponding number of the grating units at the corresponding positions to switch off to form the dark grating units on the basis of the number of the grating units comprised in each of the dark grating units and the position of said dark grating unit.

16. The 3D display method according to claim 14, wherein in response to the bright grating unit having a different width from that of the dark grating unit, controlling the corresponding grating units in the grating to switch on to form the bright grating units on the basis of the widths of the dark grating units and the positions of the dark grating units comprises:
  calculating the number of the grating units comprised in each of the dark grating units on the basis of the width of said dark grating unit and a width of an individual grating unit in the grating;
  controlling the corresponding number of the grating units at the corresponding positions to switch off to form the dark grating units on the basis of the number of the grating units comprised in each of the dark grating units and the position of said dark grating unit.

17. The 3D display method according to claim 11, wherein controlling the corresponding grating units in the grating to switch on to form the bright grating units on the basis of the widths of the bright grating units and the positions of the bright grating units comprises:
  calculating the number of the grating units comprised in each of the bright grating units on the basis of the width of said bright grating unit and a width of an individual grating unit in the grating;
  controlling the corresponding number of the grating units at the corresponding positions to switch on to form the bright grating units on the basis of the number of the grating units comprised in each of the bright grating units and the position of said bright grating unit.

* * * * *